United States Patent [19]
Zaidan

[11] 3,861,816
[45] Jan. 21, 1975

[54] COUPLING FOR TUBULAR SCAFFOLDING

[76] Inventor: Joseph Maurice Zaidan, Farra Building Solh St., Beirut, Lebanon

[22] Filed: Sept. 20, 1973

[21] Appl. No.: 399,156

[52] U.S. Cl.................. 403/385, 403/389, 403/391, 403/400
[51] Int. Cl............................................. F16b 7/00
[58] Field of Search .......... 403/385, 400, 398, 399, 403/389, 391, 395

[56] References Cited
UNITED STATES PATENTS
2,494,826  1/1950  Mulder ............................... 403/385
FOREIGN PATENTS OR APPLICATIONS
458,566  12/1936  Great Britain ...................... 403/385
1,286,193  1/1962  France ................................ 403/400
147,113  6/1952  Australia ............................. 403/399
1,490,588  6/1967  France ................................ 403/399

*Primary Examiner*—Andrew V. Kundrat
*Attorney, Agent, or Firm*—Watson, Cole, Grindle & Watson

[57] ABSTRACT

A coupling for tubular scaffolding includes a central link with two pair of arms projecting therefrom in opposite directions, each pair of arms being arranged to embrace a respective one of two mutually inclined scaffolding tubes, each arm having apertures, and a pair of notched wedges each projecting through such apertures in respective ones of the arms and arranged to bear upon a scaffolding tube embraced by the pair of arms whereby the two scaffolding tubes can be locked together.

5 Claims, 5 Drawing Figures

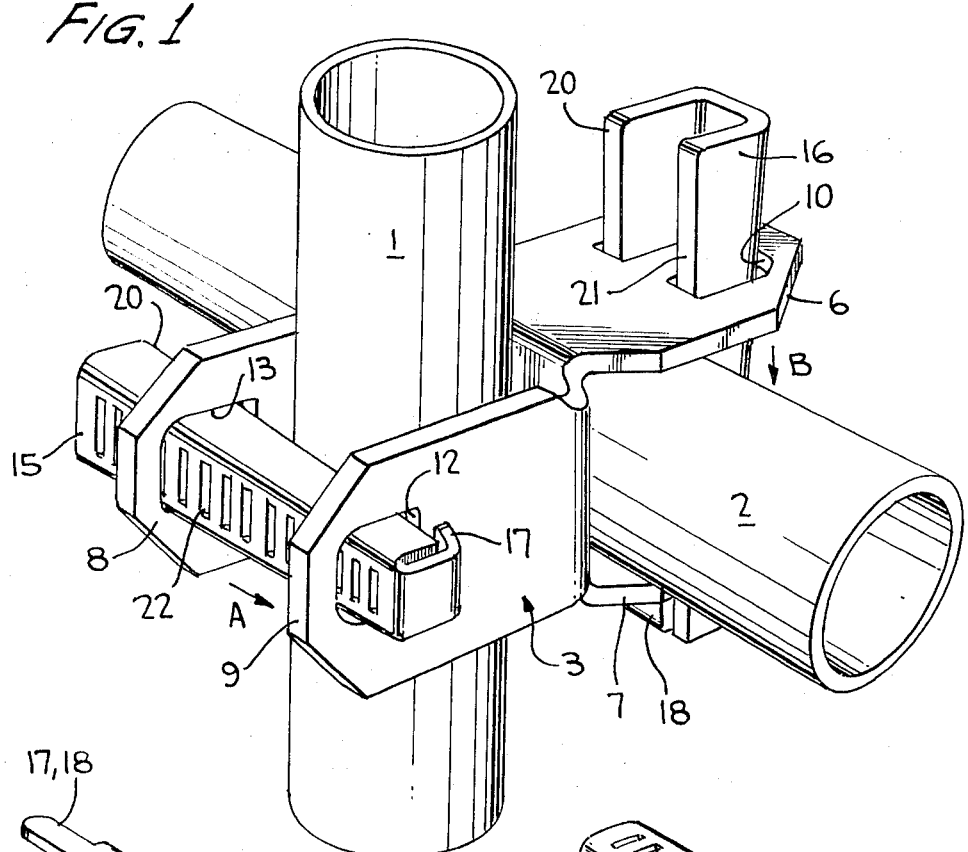
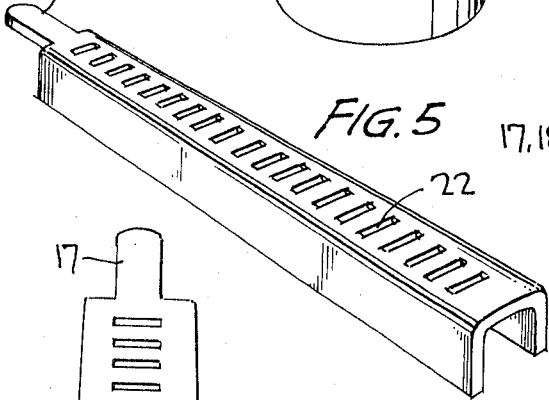
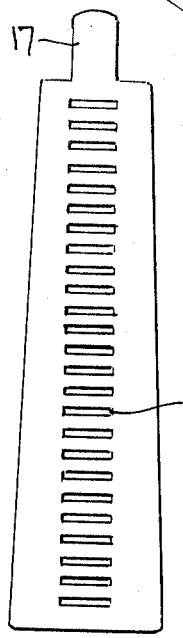
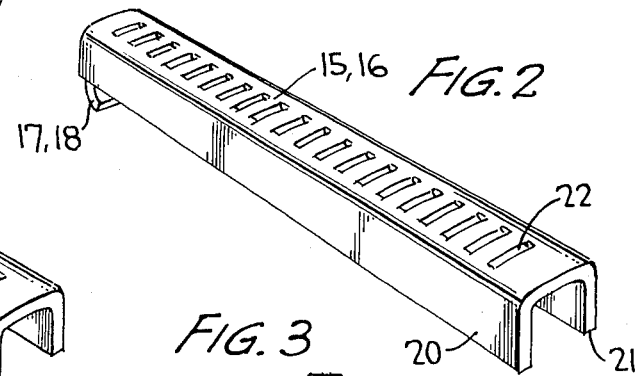
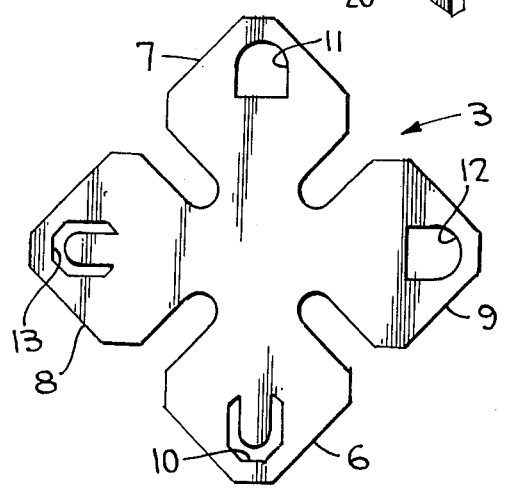

COUPLING FOR TUBULAR SCAFFOLDING

This invention relates to couplings for tubular scaffolding.

Most couplings used in joining scaffolding tubes together during the erection of scaffolds include nuts and bolts to secure the couplings to the scaffolding tubes. The erection of a scaffold with such couplings is a lengthy process even under the best of conditions, and the screw threads of the bolts of the couplings are particularly susceptible to damage and rusting.

According to the present invention, there is provided a coupling for tubular scaffolding including a central link, two pair of arms projecting from the link in opposite directions, each pair of arms being arranged to embrace a respective one of two mutually inclined scaffolding tubes, apertures in each of the arms, and a pair of wedges each projecting through the apertures in a respective one of the pair of arms and arranged to bear upon a scaffolding tube embraced by the pair of arms whereby the two scaffolding tubes can be locked together.

The arms may project from the central link in a manner suitable for embracing two scaffolding tubes disposed at any desired angle to one another as, for example, 30°, 45°, 60° or 90°. In the preferred embodiment of the invention which will be described hereinafter, however, the coupling is adapted to link two mutually perpendicular scaffolding tubes.

Preferably, the central link is of unitary construction. Such a construction avoids welds, hinges or other joints and is, as a result, not only strong but economical to manufacture.

Also, each of the wedges is of a unitary construction and is conveniently U-shaped in transverse cross-section. Desirably, each wedge is provided with a projection which engages with one of the arms of the central link and prevents the wedge from being completely withdrawn from either of the apertures through which it projects.

The apertures in the arms may be of any suitable shape but are preferably complementary to at least one surface of the wedge. If wedges of U-shaped cross-section are used, one of the apertures through which each wedge projects is also preferably U-shaped so that this aperture acts as a guide for the wedge.

In order that the invention may be better understood, a preferred embodiment thereof will now be described, by way of example only, and with reference to the accompanying drawings, in which:

FIG. 1 is a perspective view of a preferred embodiment of a coupling in accordance with this invention;

FIG. 2 is a perspective view of one of the wedges shown in FIG. 1;

FIG. 3 illustrates the shape of a blank from which the central link of the coupling illustrated in FIG. 1 can be manufactured;

FIG. 4 illustrates the shape of a blank from which one of the wedges illustrated in the coupling shown in FIG. 1 can be manufactured; and FIG. 5 is a perspective view of one of the wedges of the coupling shown in FIG. 1 immediately prior to its insertion into the coupling.

Referring to FIG. 1, there is shown a preferred embodiment of a coupling in accordance with this invention which joins two lengths of tubular scaffolding 1 and 2 together at an angle of 90°. The coupling comprises a central link 3 and two wedges 15, 16.

The central link 3 (see FIG. 3) includes two pair of arms 6, 7, 8 and 9, one pair of arms 6 and 7 projecting from the central link 3 in an opposite direction to the other pair of arms 8 and 9. The arms of each pair embrace a respective one of the scaffolding tubes. The end portions of each of the arms are inclined with respect to the remainder of the arms so that, in each pair of arms, the end portions diverge outwardly from one another in order to facilitate insertion of the tubular scaffolding between the arms prior to the insertion of wedges 15 and 16.

Each of the arms defines an aperture 10, 11, 12 and 13. A wedge 15 projects through apertures 12 and 13 in arms 8 and 9, and a similar wedge 16 projects through apertures 10 and 11 in the arms 6 and 7. Each of these wedges 15 and 16 is similar in construction and includes an in-turned projection in the form of tongues 17 and 18 at the narrower end of the wedge.

A row of notches 22 provided on the outer surface of the wedges prevents accidental sliding-out of the wedges as a result of vibration.

As best shown in FIG. 2, the wedges are generally U-shaped in transverse cross-section. The apertures 10, 11, 12 and 13 are each provided with one U-shaped surface which is complementary to the external surface of the wedges. The apertures 10 and 13 are in the form of U-shaped slots and, therefore, act as a guide for the movement of wedges 16 and 15 in the apertures.

The central link 3 and wedges 15 and 16 are both of unitary construction and are made of, for example, 6 mm. thickness mild steel. In the manufacture of the coupling, a sheet of this material is cut and perforated into the shape of the blanks illustrated in FIGS. 3 and 4. The blank illustrated in FIG. 3 is then pressed into the central link 3. The blank illustrated in FIG. 4 is pressed into a wedge of U-shaped cross-section, as shown in FIG. 5. The U-shaped cross-section provides an advantageous construction by reason of the finished wedge having two straight camming edges 20 and 21, which engage with the scaffolding tube when the coupling is in use. The arched body of the wedge which joins the camming edges 20 and 21 engages the complementary curved surfaces of the apertures in the arms of central link 3. The entire wedges is, therefore, a double wedge, since each of the camming edges 20 and 21 produces a wedging force in the coupling.

In use, the tubular scaffolding elements 1 and 2 are first inserted between the arms 8, 9 and 6, 7, respectively, of central link 3. Two wedges similar to that shown in FIG. 5 are then inserted into the apertures in respective ones of the pairs of arms on the central link 3, and the tongues 17 and 18 on the end portions of the wedges are then bent inwardly. As shown in FIG. 1, these tongues 17 and 18 engage with arms 9 and 7 respectively and prevent the wedges 15 and 16 from being withdrawn completely from the central link 3, or accidentally falling out of the apertures during assembly of the coupling. A heavy hammer blow is then delivered to each of the wedges 15 and 16, thereby forcing the wedges into the apertures 12 and 13 and 10 and 11, respectively, and bringing the camming edges 20 and 21 of the wedge 15 to bear upon the external surface of the scaffolding tube 1, and bringing the external curved surface of the wedge 15 to bear on the curved interior surfaces of the apertures 13 and 12. As a result, the scaffolding tube 1 is locked into the central link 3 by the wedge 16.

In order to release the scaffolding tubes 1 and 2 from the coupling, a heavy hammer blow is brought to bear on the narrower ends of the wedges 15 and 16. The tongues 17 and 18 prevent complete removal of the wedges from the coupling.

It will be appreciated that a strong hammer blow delivered to the wedges 15 and 16 in order to secure the scaffolding tubes 1 and 2 into the coupling will cause a resilient deformation of the scaffolding tubes 1 and 2 by the wedges 15 and 16. This resilient deformation is of assistance in ensuring that the coupling is not accidentally disconnected. Thus, if the wedges 15 and 16 are moved in the direction of arrows A and B slightly as a result of vibration or an accidental blow, the resulting deformation of the scaffolding tubes 1 and 2 still maintains the scaffolding tubes in firm contact with the coupling 3.

Each of the arms 8, 9, 10 and 11 is preferably at least 7 and desirably 8 cms wide, that the arms of the coupling give extra support to the scaffolding tubes 1 and 2. The points of interconnection of the two tubes 1 and 2 is thereby rendered a point of semi-fixation. The buckling lengths of the scaffolding tubes are, therefore, reduced and, as a result, the tubes can carry larger loads. If the width of the arms is substantially smaller than 8 cms (for example 5 cms), the connection between the two scaffolding tubes 1 and 2 is no longer rendered a semi-fixation type connection but becomes a hinged fixation type connection.

The double-coupling which is illustrated in the drawings is capable of forming a very secure connection between two scaffolding tubes 1 and 2, and tests on the coupling illustrated in FIG. 1 have shown that the coupling is capable of resisting a force of 1800 kgs. applied by an hydraulic ram to one of the two tubes 1 and 2. This performance of the coupling is very satisfactory in view of the fact that normal loadings on scaffolding couplings are of the order of 750 kgs. The coupling can, therefore, be assembled and disassembled very quickly and easily by the simple application of a sharp hammer blow and yet provides a rigid and strong connection. While a double-coupling can be removed from the scaffolding quickly and easily, the coupling is, nevertheless, safe from accidental dismantling, even under the worst conditions of movement and vibration.

The double-coupling described above also has the considerable advantage over couplings which incorporate nuts and bolts in that it is not susceptible to damage by rusting and can still be assembled or disassembled even under the worst conditions.

In addition to these technical and labor-saving advantages, the coupling is extremely easy and economical to manufacture. Thus, each coupling requires only three operations; cutting, perforating and bending, each of which can easily be carried out on an eccentric press. This facility of manufacture enables the coupling to be mass-produced much more easily than couplings involving screws or hinges.

Obviously, many modifications and variations are possible in the light of the above teachings. It is therefore to be understood that, within the scope of the appended claims, the invention may be practiced otherwise than as specifically described.

What is claimed is:

1. A coupling for tubular scaffolding comprising, a central link, two pairs of arms projecting from the link in opposite directions, each pair of arms being arranged to embrace a respective one of two mutually inclined scaffolding tubes, apertures in each of the arms, and a pair of notched wedges each being generally U-shaped in transverse cross-section, each of said wedges projecting through the apertures in respective ones of the pairs of arms and arranged so that the free edges of the U-shaped cross-section bear upon a scaffolding tube embraced by the pair of arms whereby the two scaffolding tubes can be locked together and each of said wedges having a plurality of notches in the bottom of the U-shaped cross-section, said notches being arranged to bear against said arms thereby locking said wedges within said apertures in said arms.

2. A coupling according to claim 1 wherein each pair of arms is arranged to embrace a respective one of the two mutually perpendicular scaffolding tubes.

3. A coupling according to claim 1 wherein the central link is of unitary construction.

4. A coupling according to claim 1 wherein each wedge includes a projection which prevents the wedge from being completely withdrawn from either of the apertures through which it projects.

5. A coupling according to claim 1 wherein each arm is approximately 8 cms. in width.

* * * * *

UNITED STATES PATENT OFFICE
CERTIFICATE OF CORRECTION

Patent No. 3,861,816             Dated January 21, 1975

Inventor(s) Joseph M. Zaidan

It is certified that error appears in the above-identified patent and that said Letters Patent are hereby corrected as shown below:

In the specification, please provide a reference to the patent application which was filed in France on March 7th, 1973, Serial No. 73-08147, the priority rights of which were claimed during the prosecution of the present patent.

Signed and sealed this 20th day of May 1975.

(SEAL)
Attest:

RUTH C. MASON
Attesting Officer

C. MARSHALL DANN
Commissioner of Patents
and Trademarks